(12) United States Patent
Moriguchi et al.

(10) Patent No.: US 11,252,949 B2
(45) Date of Patent: Feb. 22, 2022

(54) FISHING REEL

(71) Applicant: GLOBERIDE, Inc., Tokyo (JP)

(72) Inventors: Takumi Moriguchi, Tokyo (JP); Yuichi Umezawa, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 15/930,535

(22) Filed: May 13, 2020

(65) Prior Publication Data

US 2021/0015083 A1    Jan. 21, 2021

(30) Foreign Application Priority Data

Jul. 17, 2019  (JP) .............................. JP2019-131705

(51) Int. Cl.
*A01K 89/01* (2006.01)
*A01K 89/015* (2006.01)

(52) U.S. Cl.
CPC ...... *A01K 89/0188* (2015.05); *A01K 89/0111* (2013.01)

(58) Field of Classification Search
CPC ............ A01K 89/0188; A01K 89/0189; A01K 89/0193; A01K 89/01931
See application file for complete search history.

(56) References Cited

U.S. PATENT DOCUMENTS 6,216,969 B1 * 4/2001 Yamaguchi .......... A01K 89/015
242/260
2010/0006690 A1 1/2010 Takechi

FOREIGN PATENT DOCUMENTS

| GN | 101622979 A | 1/2010 |
| JP | 2575471 Y2 | 4/1998 |
| JP | 2008-271874 A | 11/2008 |

OTHER PUBLICATIONS

Chinese Office Action and English Translation for related Chinese Application No. 202010536326.1; action dated Dec. 3, 2021; (11 pages).

* cited by examiner

*Primary Examiner* — Emmanuel M Marcelo
(74) *Attorney, Agent, or Firm* — K&L Gates LLP

(57) ABSTRACT

A fishing reel includes a spool supported between side plates of a reel body through a spool shaft; and a clutch mechanism that switches between a power transmission state that winds a fishing line and a power cutoff state capable of unwinding a fishing line by moving a pinion gear of a winding drive mechanism in an axial direction of the spool shaft by operating the switching operation member provided on the reel body to engage and disengage clutch engagement portions of the spool shaft and the pinion gear, wherein, provided between the bearing that supports the spool shaft and the clutch engagement portion on the spool shaft side are: a first elastic portion applying an elastic force to an end of the pinion gear in the power transmission state; and a second elastic portion constantly energizing a side of the bearing in the axial direction of the spool shaft.

5 Claims, 4 Drawing Sheets

FISHING REEL

TECHNICAL FIELD

This disclosure relates to a fishing reel having a clutch mechanism that switches, between a fishing line winding state and a fishing line unwinding state, a spool rotatably supported in between the side plates of the reel body.

BACKGROUND

In a biaxial fishing reel, a clutch mechanism may be provided for switching between a power transmission state (clutch-ON state) to wind and drive the spool and a power cutoff state (clutch-OFF state) to bring the spool into a free rotation state, a spool rotatably supported in between the side plates (in between the frames) of the reel body.

Specifically, the clutch mechanism switches the clutch ON and OFF by axially moving a pinion gear that receives a driving force from the handle side to engage and disengage the pinion gear with or from the spool shaft of the spool. In that situation, the pinion gear has an engagement recess engaged with the engagement protrusion formed at that end of the spool shaft. Therefore, when the engagement recess is moved by the clutch mechanism toward the spool shaft, the engagement recess is engaged with the engagement protrusion of the spool shaft, and the operating force of the handle is transmitted to the spool shaft (clutch-ON state). However, when the engagement recess is moved by the clutch mechanism away from the spool shaft, the engagement recess is disengaged from the engagement protrusion of the spool shaft, and the operating force of the handle is not transmitted to the spool shaft (clutch-OFF state).

In a clutch mechanism that engages and disengages power transmission, to smoothly perform engagement and disengagement operations of the pinion gear that slides in the axial direction relative to the spool shaft, a certain dimensional play is generally provided between the engagement protrusion and the engagement recess. However, if such play is provided between the engagement portions of the spool shaft and the pinion gear, a backlash caused by a gap arising between the spool shaft and the pinion gear as well as the influence of the concentricity misalignment or the like arising in the course of manufacturing these two members are likely to cause vibration and abnormal noise. This interferes with fishing operations, particularly when rotating the spool and winding a fishing line at a high speed in the clutch-ON state in which the spool shaft is engaged with the pinion gear.

Therefore, it is known from Japanese Utility Model Registration No. 2575471 and Japanese Patent Application Publication No. 2008-271874 and the like that an elastic member is interposed between the counter surfaces of the spool shaft and the pinion gear facing each other in the axial direction, or between the counter surfaces of the engagement protrusion and the engagement recess facing each other in the rotational direction to suppress the backlash described above in the clutch-ON state to prevent the occurrence of abnormal noise.

An elastic member interposed between the spool shaft and the pinion gear can prevent the occurrence of abnormal noise caused by a backlash between the spool shaft and the pinion gear in the clutch-ON state. However, during actual fishing operations using a biaxial fishing reel, a spool repeatedly rotates not only in a fishing line winding state in which the fishing line is wound on the spool with the clutch being turned ON, but also in a fishing line unwinding state in which a fishing line is unwound from the spool with the clutch being turned OFF. Therefore, in particular, when the spool rotates at a high speed during a casting operation in which the fishing line is unwound from the spool in the clutch-OFF state, abnormal rotational noise occurs in the bearing that supports the spool shaft, and the resulting deterioration in the operation feeling accompanied with the rotation of the spool of a biaxial reel has been pointed out as a problem. Such abnormal rotational noise of a bearing is caused by repeated contact and separation of the balls and the inner/outer rings in a slight gap between the outer/inner rings of the ball bearing and the balls (rolling elements) rollably held therebetween and, thus, there is a need to prevent the occurrence of abnormal noise accompanied with the spool rotation, not only in the clutch-ON state, but also in the clutch-OFF state to not hinder actual fishing operations.

However, since parts are densely arranged in a limited space in the reel portion where a spool shaft supported by a bearing and a pinion gear are engaged and disengaged, it is difficult to reserve a space large enough to take some measures to prevent the occurrence of abnormal rotational noise in both clutch-ON/OFF states. In other words, it is difficult to reserve a space sufficient to install some means to prevent the occurrence of abnormal rotational noise in two different places, namely, a place where the spool shaft and the pinion gear are engaged and disengaged, and a support portion of the bearing that supports the spool shaft.

It could therefore be helpful to provide a fishing reel that can effectively suppress vibration and abnormal noise caused by the spool rotation in a limited space regardless of the ON/OFF state of a clutch.

SUMMARY

We provide a fishing reel having a spool rotatably supported between the side plates of the reel body via a spool shaft; and a clutch mechanism that switches between a power transmission state capable of winding a fishing line and a power cutoff state capable of unwinding a fishing line by moving the pinion gear of the winding drive mechanism in the axial direction of the spool shaft by operating the switching operation member provided on the reel body to engage and disengage the clutch engagement portions of the spool shaft and the pinion gear, wherein provided between the bearing that supports the spool shaft and the clutch engagement portion on the spool shaft side are a first elastic portion that applies an elastic force to the end of the pinion gear in the power transmission state, and a second elastic portion that constantly energizes the side of the bearing in the axial direction of the spool shaft.

Thus, as the fishing reel has the first elastic portion that applies an elastic force to the end of the pinion gear in the power transmission state, the first elastic portion comes elastically in contact with, and applies an elastic force to, the end of the pinion gear in the power transmission state (in the clutch-ON state), which suppresses a backlash in the axial direction (thrust direction) and the rotational direction of the pinion gear that arises due to a gap between the clutch engagement portions of the spool shaft and the pinion gear, thereby effectively suppressing the annoying abnormal rotational noise with vibration and improving the operation feeling during actual fishing operations. Further, the fishing reel may have the second elastic portion that constantly energizes the side of the bearing in the axial direction of the spool shaft, which can be effective to prevent abnormal noise caused by micro vibration (can effectively suppress the micro vibration) on the outer peripheral portion of the bearing relative to the inner periphery of the bearing support portion of the reel body. In particular, when the bearing is a ball bearing type with rolling elements held between outer and inner rings, the second elastic portion constantly energizes the side of the bearing in the axial direction of the spool shaft to relatively displace the outer/inner rings of the bearing in the axial direction. The rolling elements, therefore, contact the inner surfaces of the outer/inner rings, respectively as a result of the relative axial displacement of the outer/inner rings, not only in the power transmission state (in the clutch-ON state), but also in the power cutoff state (in the clutch-OFF state), thereby maintaining a stable contact of the outer/inner rings and the rolling elements even when the bearing rotates. This prevents repeated contact and separation of the rolling elements and the inner/outer rings in a slight gap between the outer/inner rings and the rolling elements, which makes it possible to suppress the occurrence of abnormal rotational noise in the bearing even when the spool rotates at a high speed during the casting operation to unwind a fishing line from the spool in the clutch-OFF state.

In other words, vibration or abnormal noise caused by the spool rotation can be effectively suppressed, regardless of the ON/OFF state of the clutch, that is, in both clutch-ON/OFF states.

Further, in addition to the foregoing, the first and second elastic portions having such an action may be provided between the bearing that supports the spool shaft and the clutch engagement portion on the spool shaft side, which makes it possible to take measures, in a limited space with the effective use of the existing spaces, to suppress abnormal rotational noise at two different places, namely, the place where the spool shaft and the pinion gear are engaged and disengaged, and the support portion of the bearing that supports the spool shaft, respectively. That is, though parts are densely arranged in the reel portion where the spool shaft supported by the bearing, and the pinion gear are engaged and disengaged, a certain distance is preserved so that the clutch engagement portions of the spool shaft and the pinion gear can be engaged and disengaged without problem, which makes it possible to simultaneously suppress the occurrence of abnormal noise at two different places in a limited space with the effective use of the existing separate spaces. It is, therefore, possible to prevent the increase in size of the reel when two separate installation spaces are reserved for the first and second elastic portions.

Further, it is desirable that the first elastic portion should extend radially outward of the spool shaft to be able to come in contact with the end of the pinion gear and apply an elastic force, and that the second elastic portion should extend in the axial direction of the spool shaft to displace the inner ring in the axial direction relative to the outer ring by constantly energizing the inner ring of the bearing supported toward the reel body with the axial movement being restricted on the outer ring side. Thus, if the first and second elastic portions are distributed into two different directions perpendicular to each other, namely, the radial and axial directions, rather than being extended in the same direction, it is not necessary to reserve an installation space in either one of the radial and axial directions, which makes it possible not only to offer the greater flexibility to the space to be reserved, but also to arrange the first and second elastic portions compactly.

Further, the first and second elastic portions may be interposed between the clutch engagement portion on the spool shaft side and the bearing to be juxtaposed in the axial direction of the spool shaft as two different elastic members being elastically in contact with each other. When the first and second elastic portions are formed as separate elastic members, the first and second elastic portions can be formed of materials suitable for their respective actions to be performed, and when the first and second elastic portions come elastically in contact with each other and are juxtaposed in the axial direction, the elastic portions interact with each other to generate appropriate acting forces in both clutch-ON/OFF states. In this structure, for example, one of the first and second elastic portions may be formed of a rubber material, and the other may be formed of a spring material. In particular, considering the functions to be performed by the first and second elastic portions, it is preferable that the first elastic portion to suppress abnormal noise in the place where the clutch is engaged and disengaged in the clutch-ON state should be formed of a rubber material (e.g., rubber packing), and the second elastic portion to suppress abnormal noise at the bearing support portion in both clutch-ON/OFF states should be formed of a spring material (e.g., coil spring).

Further, the clutch engagement portion on the spool shaft side may be a pin-shaped engagement protrusion protruding radially outward of the spool shaft and also, the clutch engagement portion on the pinion gear side may be an engagement recess that is fitted to, and detachably engaged with, the engagement protrusion. This makes it possible to engage and disengage the clutch engagement portions in a smooth and reliable manner.

We thereby provide a fishing reel that can effectively suppress vibration and abnormal noise caused by spool rotation in a limited space, regardless of the ON/OFF state of a clutch.

DESCRIPTION OF THE NUMERICAL REFERENCES

Figure 1:
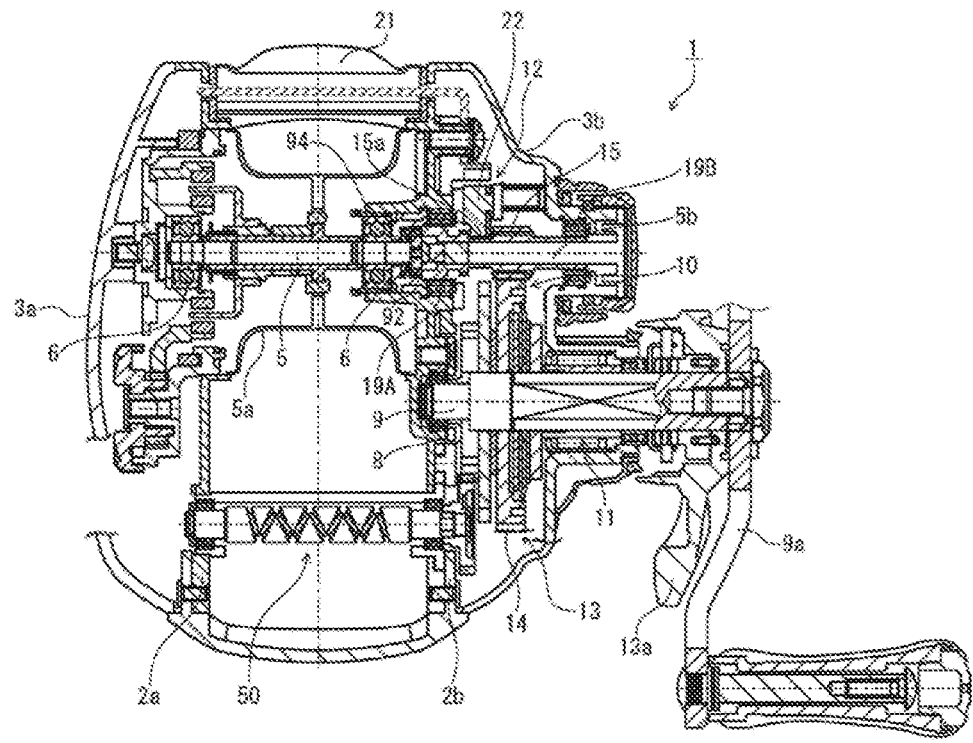
FIG. 1 is a sectional view of a fishing reel according to an example.

1 Fishing reel
3a, 3b Side plates
5 Spool shaft
5a Spool
6 Bearing

6a Outer ring
6b Inner ring
6c Rolling element
10 Driving force transmission mechanism (winding drive mechanism)
12 Clutch mechanism
15 Pinion (pinion gear)
21 Operating member (switching operation member)
40 First elastic portion
42 Second elastic portion
92 Engagement recess (clutch engagement portion)
94 Engagement protrusion (clutch engagement portion)

DETAILED DESCRIPTION

Examples will be described with reference to the accompanying drawings.

As shown in FIG. 1, the body of the fishing reel 1 is configured by left and right frames 2a and 2b, and circular/different-shaped left and right side plates 3a and 3b that are mounted on these left and right frames 2a and 2b. The left and right frames 2a and 2b are integrated through a plurality of struts, and a reel leg (not illustrated) mounted on the reel sheet of the fishing rod is provided in the lower strut.

A spool shaft 5 is rotatably supported through a bearing 6 between the left and right frames 2a and 2b (left and right side plates 3a and 3b), and a spool 5a on which a fishing line is wound is attached to the spool shaft 5. In this example, the bearing 6 that supports the spool shaft 5 is formed as a ball bearing in which rolling elements (balls) 6c are retained by the cage between an outer ring 6a and an inner ring 6b.

A handle shaft 9 is rotatably supported through a bearing 8 by the right frame 2b and the right side plate 3b, and a handle 9a is mounted on the end of the handle shaft 9. In this example, when the handle 9a is rotated, the operating force is transmitted to the spool 5a through a driving force transmission mechanism (winding drive mechanism) 10 to rotationally drive the spool 5a. The handle shaft 9 is made rotatable only in the fishing line winding direction by a rolling type one-way clutch 11 (reverse rotation prevention mechanism) interposed between the handle shaft 9 and the right side plate 3b.

A known clutch mechanism 12 that engages and disengages the transmission of the driving force of the driving force transmission mechanism 10 and a known drag mechanism 13 that applies a drag force to the spool 5a when a fishing line is unwound from the spool 5a during fishing operations are housed between the right frame 2b and the right side plate 3b.

In the vicinity of the handle 9a, a drag adjusting knob 13a is provided to adjust the drag force exerted by the drag mechanism 13 and in addition, a level winding mechanism 50 is provided on the front of the spool 5a for line-winding a fishing line on the spool 5a. Further, an operation member (switching operation member) 21 of the clutch mechanism 12 having also a function as a finger rest member (thumb rest) on which a finger (thumb) abutting on the spool 5a can be placed is provided between the left and right frames 2a and 2b (left and right side plates 3a and 3b) on the back of the spool 5a (the side of the spool 5a opposite to the level winding mechanism 50).

The driving force transmission mechanism 10 includes a drive gear 14 rotatably supported by the handle shaft 9, and a pinion (pinion gear) 15 meshing with the drive gear 14. The pinion 15 is provided on a pinion shaft 5b that extends coaxially with the spool shaft 5 (formed integrally with, or separately from, the spool shaft 5) and is, together with the pinion shaft 5b, rotatably supported by the reel body through bearings 19A and 19B, thereby capable of moving axially along the pinion shaft 5b. Further, a circumferential groove 15a is formed on the outer periphery of the pinion 15, and a yoke 22 that constitutes the clutch mechanism 12 for moving the pinion 15 in the axial direction and is energized by a spring material toward the spool 5a as is generally known is engaged with the circumferential groove 15a.

Figure 2:
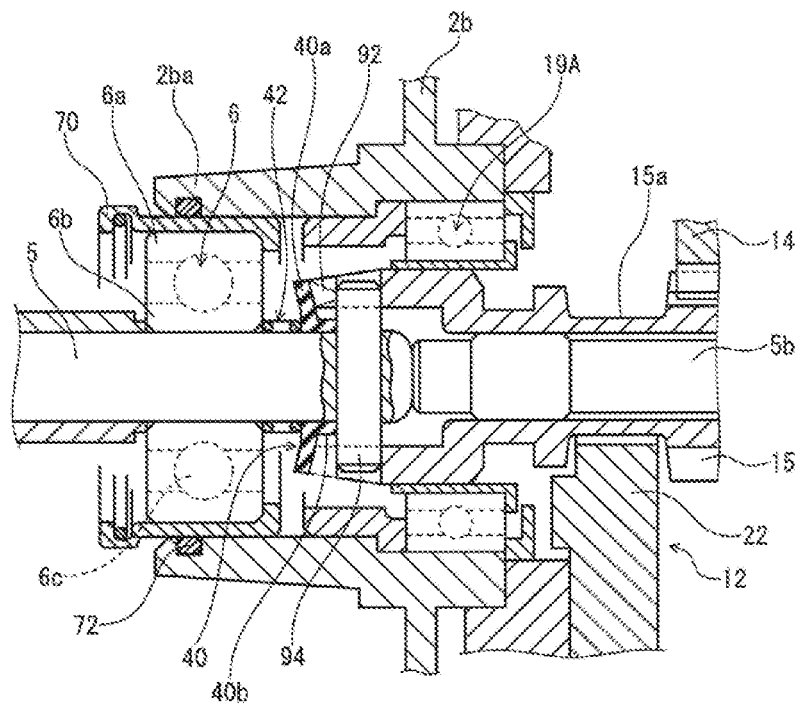
FIG. 2 is an enlarged sectional view of a main part of the fishing reel in FIG. 1 in the clutch-ON state.
Figure 3:
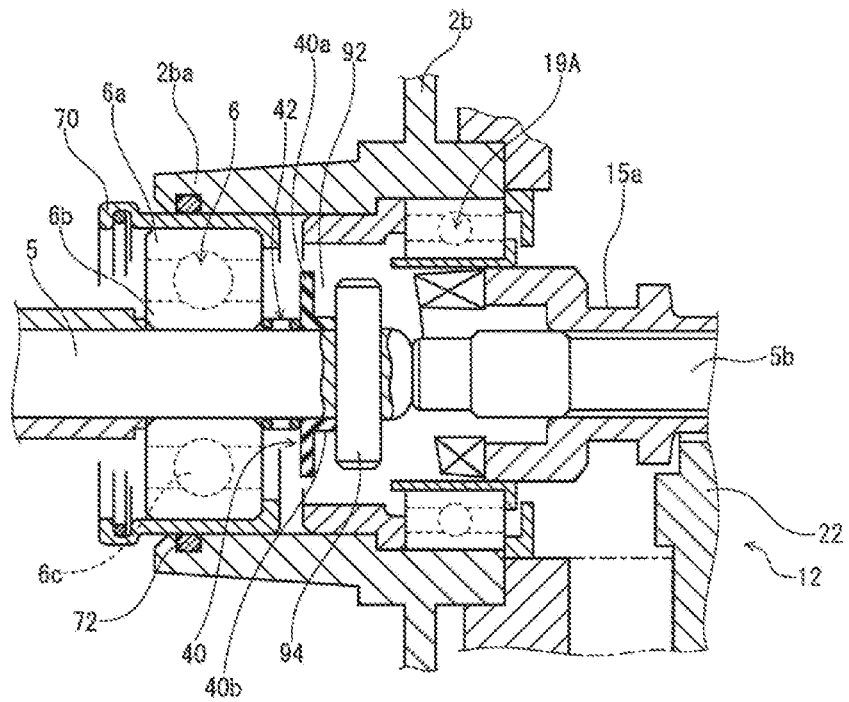
FIG. 3 is an enlarged sectional view of a main part of the fishing reel in FIG. 1 in the clutch-OFF state.

Further, as shown in the enlarged views in FIGS. 2 and 3 (FIG. 1 flipped upside down; the same applies to FIGS. 4, 5 and 7), the spool shaft 5 has, at the end on the side facing the pinion 15, an engagement protrusion 94 as a pin-shaped clutch engagement portion protruding radially outward of the spool shaft 5. The pinion 15 also has an engagement recess 92 as a clutch engagement portion that is fitted to, and detachably engaged with, the engagement protrusion 94 of the spool shaft 5, at the end on the side facing the spool shaft 5. Accordingly, in this example, when the operating member 21 is pressed and moved downward (pushing operation) with, for example, a thumb placed on the operating member 21 configured as a clutch lever, the pinion 15 is moved by the known clutch cam and the yoke 22 of the clutch mechanism 12 away from the spool shaft 5 toward the right side plate 3b along the pinion shaft 5b, whereby the engagement recess 92 of the pinion 15 is disengaged from the engagement protrusion 94 of the spool shaft 5 as shown in FIG. 3 and the clutch is turned off not to transmit the operating force of the handle 9a to the spool shaft 5 (spool 5a) (power cutoff state capable of unwinding a fishing line), which makes it possible to freely rotate the spool 5a forward and backward. On the other hand, when the operation member 21 is pulled up to the original position in the clutch-OFF state, or when a known automatic return mechanism is activated by the winding operation of the handle 9a, the pinion 15 is moved toward the spool 5a along the pinion shaft 5b by the yoke 22 energized toward the spool 5a, whereby the engagement recess 92 of the pinion 15 is fitted to, and engaged with, the engagement protrusion 94 of the spool shaft 5 as shown in FIGS. 1 and 2 and the clutch is turned on (power transmission state capable of winding a fishing line) to transmit the operating force of the handle 9a (rotational driving force of the drive gear 14) to the spool shaft 5 (spool 5a), which makes it possible to allow the spool 5a to rotate only in the fishing line winding direction.

Though not illustrated, the clutch mechanism 12 is distributed into, and held in, both the clutch-ON/OFF states by a known distribution spring member.

In this example, to smoothly perform the engagement and disengagement operations between the engagement protrusion 94 and the engagement recess 92 by the clutch mechanism 12, a certain dimensional play is provided between the engagement protrusion 94 and the engagement recess 92 when they are engaged conventionally. However, as described above, if such a play is provided between the engagement portions, a backlash or the like caused by a gap between the clutch engagement portions are likely to cause vibration and abnormal noise in the clutch-ON state under which the engagement protrusion 94 is engaged with the engagement recess 92, especially when a fishing line is wound by rotating the spool at a high speed, which interferes with fishing operations. Therefore, in this example, the first elastic portion 40 that applies an elastic force to the end of the pinion 15 that forms the engagement recess 92 in the clutch-ON state (power transmission state) is provided between the bearing 6 that supports the spool shaft 5 (the bearing 6 on the right frame 2b side) and the engagement protrusion 94. The first elastic portion 40 is formed of an elastic member, in particular a rubber material (e.g., rubber packing), and has a radially extending annular portion 40a that extends radially outward of the spool shaft 5 from one end of a base 40b to be elastically deformed when a cylindrical base 40b, which is fitted to the outer periphery of the spool shaft 5 and extends in the axial direction, comes in contact with the end of the pinion 15 (in FIG. 2, the states before and after deformation are indicated by a broken line and a solid line, respectively). In this example, the base 40b is positioned so that the other end abuts on the outer periphery of the engagement protrusion 94 from the axial direction, also the radially extending portion 40a extends substantially parallel to the engagement protrusion 94 from one end of the base 40, and has a diameter (diameter around the axis of the spool shaft) large enough to come in contact with the end of the pinion 15 in the clutch-ON state.

Such first elastic portion 40 is elastically deformed toward the bearing 6 when made to elastically contact with the end of the pinion 15 in the clutch-ON state, the contact pressure arising from which can suppress the movement of the pinion 15 in the axial and rotational directions relative to the spool shaft 5 (a backlash caused by a gap between the engagement protrusion 94 and the engagement recess 92).

Further, in this example, a ball bearing is adopted as the bearing 6 that rotatably supports the spool shaft 5 and, therefore, in particular, when the spool 5a rotates at a high speed during a casting operation of unwinding a fishing line from the spool 5a in the clutch-OFF state, abnormal rotational noise may be caused by repeated contact and separation of the rolling elements 6c, an inner ring 6b and the outer ring 6a in a slight gap between the outer ring 6a and the inner ring 6b, and the rolling elements 6c rollably held therebetween. Therefore, we provide a second elastic portion 42 between the bearing 6 and the engagement projection 94, which constantly energizes the side of the bearing 6 in the axial direction of the spool shaft 5 to relatively displace the outer ring 6a and the inner ring 6b of the bearing 6 in the axial direction. In particular, in this example, the second elastic portion 42 extends in the axial direction of the spool shaft 5 to displace the inner ring 6b in the axial direction relative to the outer ring 6a, constantly energizing the inner ring 6b of the bearing 6.

In this example, the second elastic portion 42 is formed of an elastic member other than that of the first elastic portion 40, in particular, a spring material (e.g., coil spring) and has an tubular body fitted to the outer periphery of the spool shaft 5. Further, one end of the second elastic portion 42 abuts on the bearing 6 (the inner ring 6b in this structure) from the axial direction, and the other end abuts on the first elastic portion (the base 40b) from the axial direction. That is, the first and second elastic portions 40 and 42, which are elastically in contact with each other, are interposed between the engagement projection 94 and the bearing 6 to be juxtaposed in the axial direction of the spool shaft 5.

Not only in the clutch-ON state, but also in the clutch-OFF state, the second elastic portion 42 brings the rolling elements 6c into contact with the inner surface of the outer ring 6a and the inner surface of the inner ring 6b, respectively, relatively displacing the outer ring 6a and the inner ring 6b in the axial direction, and maintains a stable contact of the outer/inner rings 6a and 6b and the rolling elements 6c even when the bearing 6 rotates.

Figure 6A:
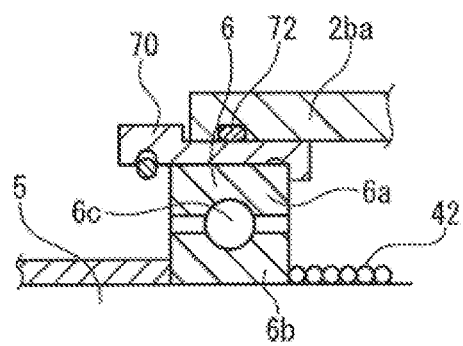
FIG. 6(a) is an enlarged sectional view of the bearing support portion of the fishing reel in FIG. 1.

Further, in this example, to allow the second elastic portion 42 to displace the inner ring 6b in the axial direction relative to the outer ring 6a, the bearing 6 is supported toward the reel body with the axial movement being restricted on the outer ring 6a side. Specifically, as clearly illustrated in FIGS. 2, 3 and 6(a), a press-fitted annular cap (bush) 70 is attached to the outer periphery of the outer ring 6a of the bearing 6, and the cap 70 is detachably press-fitted into, and held in, a support portion 2ba of the right frame 2b of the reel body. That is, the bearing 6 is supported by press-fitting through the cap 70 toward the reel body with the axial movement being restricted on the outer ring 6a side. In particular, the cap 70, which is formed by SUS, forms an integral unit together with the spool shaft 5, and is attached to, and detached from, the reel body integrally with the spool shaft 5 when the spool shaft 5 is attached to, or detached from the reel body.

Further, an O-ring 72 is elastically and deformably mounted between the outer periphery of the cap 70 and the support portion 2ba, a frictional force is applied to the cap 70 to the extent detachable from the support portion 2ba, and the vibration of the bearing 6 is also absorbed.

Figure 6B:
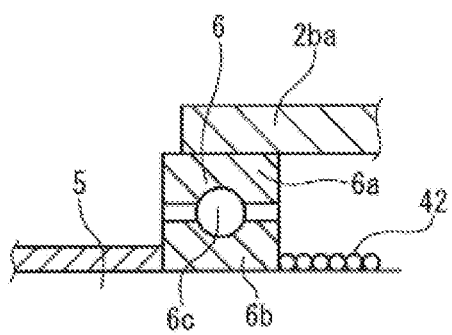
FIG. 6(b) is an enlarged sectional view of a first modification of the bearing support portion.
Figure 6C:
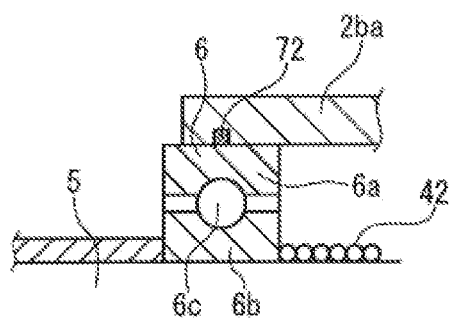
FIG. 6(c) is an enlarged sectional view of a second modification of the bearing support portion.
Figure 6D:
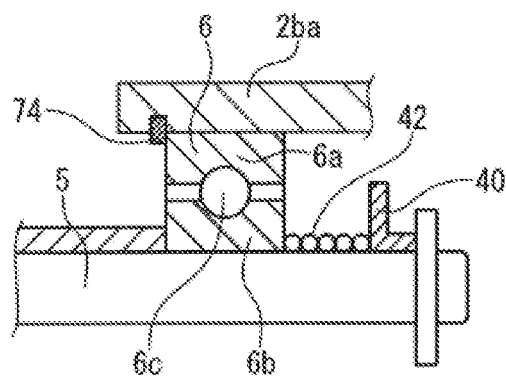
FIG. 6(d) is an enlarged sectional view of a third modification of the bearing support portion.

FIGS. 6(b) through 6(d) show other structural examples that supports the bearing 6 toward the reel body with the axial movement being restricted on the outer ring 6a side of the bearing 6. In FIG. 6(b), the bearing 6 without the cap 70 described above is detachably press-fitted directly into, and held in, the support portion 2ba. Further, in FIG. 6(c), in addition to the structure in FIG. 6(b), the annular O-ring 72 is interposed between the inner periphery of the support portion 2ba and the outer periphery of the outer ring 6a of the bearing 6. In this example, the O-ring 72 is fitted into the groove on the inner periphery of the support portion 2ba. Further, in FIG. 6(d), the axial movement of the bearing 6 in a direction away from the engagement projection 94 is prevented by a retaining ring 74 that is supported by the inner periphery of the support portion 2ba and that abuts on the end edge of the outer ring 6a of the bearing 6. Again, the retaining ring 74 is fitted into the groove on the inner periphery of the support portion 2ba.

As described above, the fishing reel 1 which has the first elastic portion 40 with which the end of the pinion 15 elastically comes in contact in the power transmission state (clutch-ON state) to apply an elastic force suppresses a backlash in the axial direction (thrust direction) and the rotation direction of the pinion 15 that is caused by a gap between the clutch engagement portions 92 and 94 of the spool shaft 5 and the pinion 15, as well as effectively dampens the annoying abnormal rotational noise accompanied with vibration to improve the operation feeling during actual fishing operations.

In addition, since the fishing reel 1 further includes the second elastic portion 42 that constantly energizes the side of the bearing 6 in the axial direction of the spool shaft 5 to relatively displace the outer ring 6a and the inner ring 6b of the bearing 6 in the axial direction, the rolling elements 6c come in contact with the inner surface of the outer ring 6a and the inner surface of the inner ring 6b as a result of the relative axial displacement of the outer ring 6a and the inner ring 6b not only in the power transmission state (clutch-ON state), but also in the power cutoff state (clutch-OFF state), whereby the outer ring 6a, the inner ring 6b and the rolling elements 6c maintain stable contact even when the bearing 6 rotates. This prevents repeated contact and separation of the rolling elements 6c, the inner ring 6b and the outer ring 6a in a slight gap between the outer/inner rings 6a and 6b and the rolling elements 6c, which makes it possible to suppress the occurrence of abnormal rotational noise in the bearing 6 even when the spool rotates at a high speed during a casting operation of unwinding a fishing line from the spool in the clutch-OFF state.

Further, in addition to the above, in this example, the first elastic portion 40 and the second elastic portion 42 having such an action are positioned between the bearing 6 that supports the spool shaft 5 and the clutch engagement portion (engagement protrusion) 94 on the spool shaft 5 side, which makes it possible to take some measures, in a limited space with the effective use of the existing spaces, to suppress the occurrence of abnormal noise at two different places, namely, the place where the spool shaft 5 and the pinion 15 are engaged and disengaged and the support portion of the bearing 6 that supports the spool shaft 5. That is, though parts are densely arranged in the reel portion where the spool shaft 5 supported by the bearing 6 and the pinion 15 are engaged and disengaged, a distance is reserved, which is large enough to engage and disengage without problem the engagement protrusion 94 and the engagement recess 92 between the bearing 6 and the engagement protrusion 94. This makes it possible to simultaneously suppress the occurrence of abnormal noise at two different places in a limited space, with the effective use of the existing separate spaces. It is, therefore, possible to prevent the increase in size of the reel associated with reserving separate installation spaces for two elastic portions, namely, the first and second elastic portions 40 and 42.

Further, in this example, the first elastic portion 40 extends radially outward of the spool shaft 5 to be elastically deformed when coming in contact with the end of the pinion 15, and the second elastic portion 42 extends in the axial direction of the spool shaft 5 to displace the inner ring 6b in the axial direction relative to the outer ring 6a by constantly energizing the inner ring 6b of the bearing 6 supported toward the reel body with the axial movement being restricted on the outer ring 6a side. Thus, if the first elastic portion 40 and the second elastic portion 42 are distributed into two different directions perpendicular to each other, which are the radial and axial directions, rather than being extended in the same direction, an installation space on either of the radial or axial direction need not be reserved, which not only allow more flexibility in reserving the space, but also makes it possible to compactly arrange the first and second elastic portions 40 and 42. In this sense, to further reduce the footprint of the elastic portions 40 and 42, it is preferable to eliminate the base 40b of the first elastic portion 40 or to minimize the axial dimension of the base 40b.

Further, in this example, the first elastic portion 40 and the second elastic portion 42, which are elastically in contact with each other as separate elastic members, are interposed between the engagement projection 94 and the bearing 6 to be juxtaposed in the axial direction. Thus, if the first elastic portion 40 and the second elastic portion 42 are respectively formed as separate elastic members, the first elastic portion 40 and the second elastic portion 42 can be formed of a material suitable for the actions supposed to be performed thereby, and the first elastic portion 40 and the second elastic portion 42, which are elastically in contact with each other, are juxtaposed in the axial direction so that these elastic portions 40 and 42 interact with each other to respectively generate an appropriate action force in the clutch-ON/OFF states.

Figure 4:
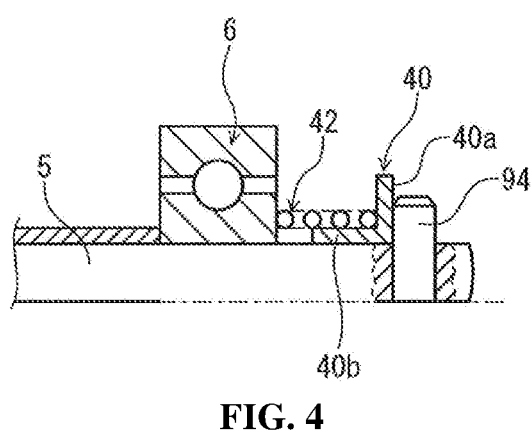
FIG. 4 is an enlarged sectional view of a modified first elastic portion.

FIG. 4 shows a modified first elastic portion 40, in which the base 40b and the radially extending portion 40a of the first elastic portion 40 are integrally formed of, for example, a hard resin material, and are mounted on the outer periphery of the base 40b on which the second elastic portion 42 (coil spring) is wound. The first elastic portion 40 itself does not have elasticity, and the radially extending portion 40a of the first elastic portion 40 abuts on the end face of the pinion 15, using the elastic force of the second elastic portion 42 in the clutch-ON state, whereby the first elastic portion 40 applies an elastic force to the end of the pinion 15.

Figure 5:
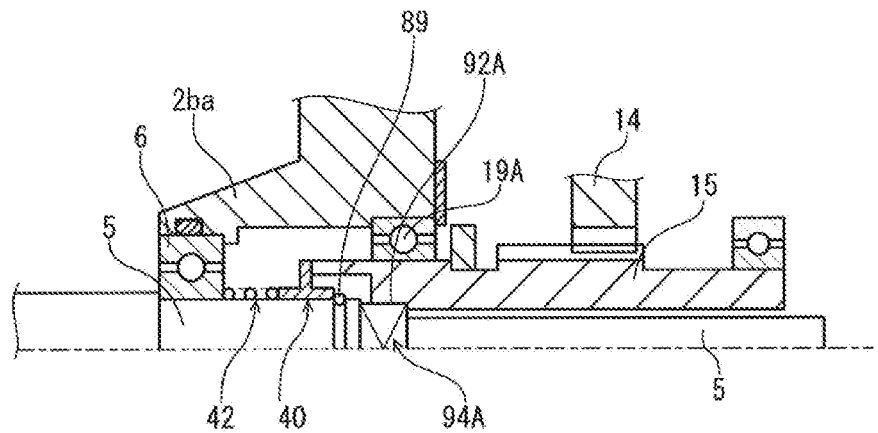
FIG. 5 is an enlarged sectional view of a modified first elastic portion, second elastic portion, and clutch engagement portion.

FIG. 5 shows a modified first elastic portion, second elastic portion and clutch engagement portion, wherein the clutch engagement portion on the spool shaft 5 side is formed of a non-circular cross-sectional protrusion 94A, and wherein the clutch engagement portion on the pinion 15 side is formed by a non-circular cross-sectional recess 92A that is fitted to, and can be detachably engaged with, the non-circular cross-sectional protrusion 94A in the clutch-ON state. In this example, the pinion shaft 5 is integral with the spool shaft 5. Therefore, the spool shaft 5 is penetrated into the inner hole of the pinion 15. Further, the first elastic portion 40 and the second elastic portion 42 are restricted in its axial movement by a retaining ring 89 attached to the outer periphery of the spool shaft 5.

Figure 7:
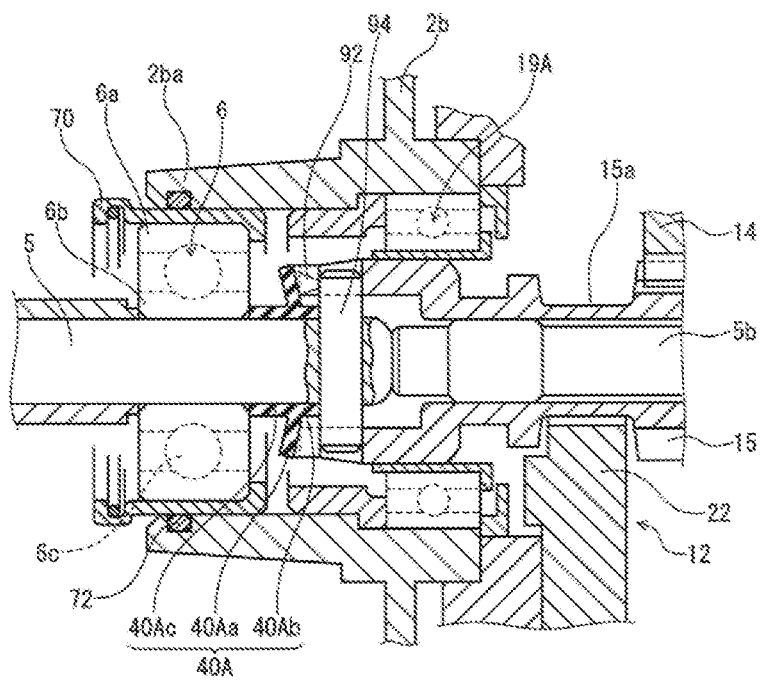
FIG. 7 is an enlarged sectional view of a main part of the fishing reel in FIG. 1 in the clutch-ON state in which the first elastic portion and the second elastic portion are integrally formed.

FIG. 7 shows a modified or second example. As illustrated, in this modification, the first elastic portion 40 and the second elastic portion 42 of the above-described example are integrally formed. Specifically, the integrated elastic portion 40A is in a form in which an annular body extends radially outward from the middle portion of a cylindrical body that is fitted to the outer periphery of the spool shaft 5 and each end of which elastically abuts on the bearing 6 and the engagement protrusion 94, respectively, and is integrally formed of a rubber material with a first cylindrical portion 40Ab corresponding to the base 40b of the first elastic portion 40 of the above-described example, an annular portion 40Aa corresponding to the radially extending portion 40a of the first elastic portion 40 of the above-described example, and a second cylindrical portion 40Ac corresponding to the second elastic portion 42 of the above-described example. Alternatively, in another modification, the first and second elastic portions 40 and 42 may be integrally formed in a line or sheet form by a spring material.

In this manner, the integral formation of the first elastic portion 40 and the second elastic portion 42 of the above-described example can be easily achieved at low cost, which also makes it easier to incorporate the first and second elastic portions into the reel body.

Needless to say, our fishing reels are not limited to the above-described examples, and can be implemented with various modifications to an extent that does not depart from the spirit of this disclosure. For example, the configurations and materials of the first and second elastic portions are not limited to the examples described above. Various arrangements of the first and second elastic portions relative to each other can also be made. In the above-described examples, the clutch engagement portions of the spool shaft and the pinion are formed of an engagement protrusion and an engagement recess, but the form of the clutch engagement portions is not limited thereto. Further, some or all of the above-described examples may be combined or some of the components may be omitted from one of the above-described examples within an extent that does not depart from the spirit of the appended claims.

The invention claimed is:

1. A fishing reel comprising:
    a spool rotatably supported between side plates of a reel body through a spool shaft; and
    a clutch mechanism that switches between a power transmission state capable of winding a fishing line and a power cutoff state capable of unwinding the fishing line by moving a pinion gear of a winding drive mechanism in an axial direction of the spool shaft by operating a switching operation member provided on the reel body to engage and disengage clutch engagement portions of the spool shaft and the pinion gear, wherein, provided between a bearing that supports the spool shaft and the clutch engagement portion on a spool shaft side are: a first elastic portion that applies an elastic force to an end of the pinion gear in the power transmission state; and a second elastic portion that constantly energizes a side of the bearing in the axial direction of the spool shaft.

2. The fishing reel according to claim 1, wherein the bearing with rolling elements held between an outer ring and an inner ring is supported toward the reel body with the axial movement being restricted on an outer ring side, the first elastic portion extends radially outwardly of the spool shaft to be able to contact the end of the pinion gear and apply an elastic force, and the second elastic portion extends in the axial direction of the spool shaft to displace the inner ring in the axial direction relative to the outer ring by constantly energizing the inner ring of the bearing.

3. The fishing reel according to claim 1, wherein the first elastic portion and the second elastic portion are interposed between the clutch engagement portion on the spool shaft side and the bearing to be juxtaposed in the axial direction of the spool shaft as two different elastic members being in contact with each other.

4. The fishing reel according to claim 3, wherein one of the first elastic portion and the second elastic portion is formed of a rubber material, and the other is formed of a spring material.

5. The fishing reel according to claim 1, wherein the clutch engagement portion on the spool shaft side is a pin-shaped engagement protrusion protruding radially outward of the spool shaft, and the clutch engagement portion on a pinion gear side is an engagement recess fitted to, and detachably engaged with, the engagement protrusion.

\* \* \* \* \*